United States Patent
Chronister

[15] 3,665,953
[45] May 30, 1972

[54] GATE VALVE

[72] Inventor: Clyde H. Chronister, Houston, Tex.

[73] Assignee: Chronister Valve Company, Inc., Houston, Tex.

[22] Filed: Jan. 22, 1971

[21] Appl. No.: 108,703

Related U.S. Application Data

[63] Continuation-in-part of Ser. No. 823,103, May 8, 1969, Pat. No. 3,557,822.

[52] U.S. Cl................137/246.22, 137/315, 251/159, 251/327
[51] Int. Cl.......................................................F16k 43/00
[58] Field of Search...................137/219, 246, 246.22, 315; 251/58, 158, 159, 168, 193, 197, 198, 326, 327, 328, 329, 369

[56] References Cited

UNITED STATES PATENTS

| | | | |
|---|---|---|---|
| 2,203,989 | 6/1940 | Hamer | 251/159 |
| 2,951,497 | 9/1960 | Laurent | 137/246.22 X |
| 3,107,892 | 10/1963 | Ellis | 251/58 X |
| 3,557,822 | 1/1971 | Chronister | 137/315 |

Primary Examiner—M. Cary Nelson
Assistant Examiner—David R. Matthews
Attorney—James F. Weiler, Jefferson D. Giller, William A. Stout, Paul L. De Verter, II, Dudley R. Dobie, Jr. and Henry W. Hope

[57] ABSTRACT

A gate valve having an inlet and an outlet conduit extending into a housing spaced from each other to provide an opening therebetween with a sleeve telescoping with the inlet and outlet conduits and a valve gate positioned for transverse movement into and out of the opening with the gate valve and sleeve being separately actuated by separate means extending through the housing whereby the outer ends of the conduits may be spaced the prescribed distance apart for interchangeability with standard sized valves and the sleeve may be firmly moved against the gate valve to seal the gate valve against the inlet conduit. Lubricant sealing grooves on the inside of said sleeve adjacent each end of the sleeve for lubricating and sealing the sleeve relative to the inlet and outlet conduits.

10 Claims, 5 Drawing Figures

Clyde H. Chronister
INVENTOR

Patented May 30, 1972

Clyde H. Chronister
INVENTOR.

BY James L. Weber
William A. Stout

ATTORNEYS

3,665,953

GATE VALVE

CROSS-REFERENCES TO RELATED APPLICATIONS

This application is a continuation in part of my copending U.S. Pat. No. 3,557,822 issued Jan. 26, 1971, entitled Gate Valve Ser. No. 823,103 filed May 8, 1969.

BACKGROUND OF THE INVENTION

Generally, it is old to provide gate valves which open and close a fluid or gas line and provide double blocking or sealing in both directions such as shown in my U.S. Pat. No. 3,557,822 issued Jan. 26, 1971.

The present invention relates to various improvements in a through conduit gate valve, which may be double sealing, if desired, and which provides a structure which not only provides increased sealing forces and allows the line to remain in operation while work is conducted on the gate, but which also allows the valve to be sized so as to be interchangeable with standard sized valves as prescribed by industry standards.

SUMMARY

The present invention is directed to a gate valve having a housing and an inlet conduit and an outlet conduit extending into the housing and being longitudinally spaced from each other to provide an opening therebetween with a sleeve slidably telescoping with the ends of the conduit to provide a through conduit valve with a valve gate positioned for movement transversely into the opening and separate actuating means connected to each of the gate and the sleeve for moving the gate or the sleeve into and away from the opening.

Another feature of the present invention is the use of separate actuating means for the gate and the sleeve whereby the outer ends of the inlet conduit and outlet conduit may be positioned the prescribed distance apart in accordance with industry standards for interchangeability and the sleeve may be firmly moved against the back of the gate valve for increased sealing.

Another feature of the present invention is the provision of annular grooves at each end of the sleeve with a hose connected to each of the grooves and extending exteriorly of the valve housing for providing a lubricating sealant in the grooves for providing lubrication between the sleeve and the inlet and outlet conduits as well as additional sealing protection.

DESCRIPTION OF THE PREFERRED EMBODIMENT

Figures 1, 2:
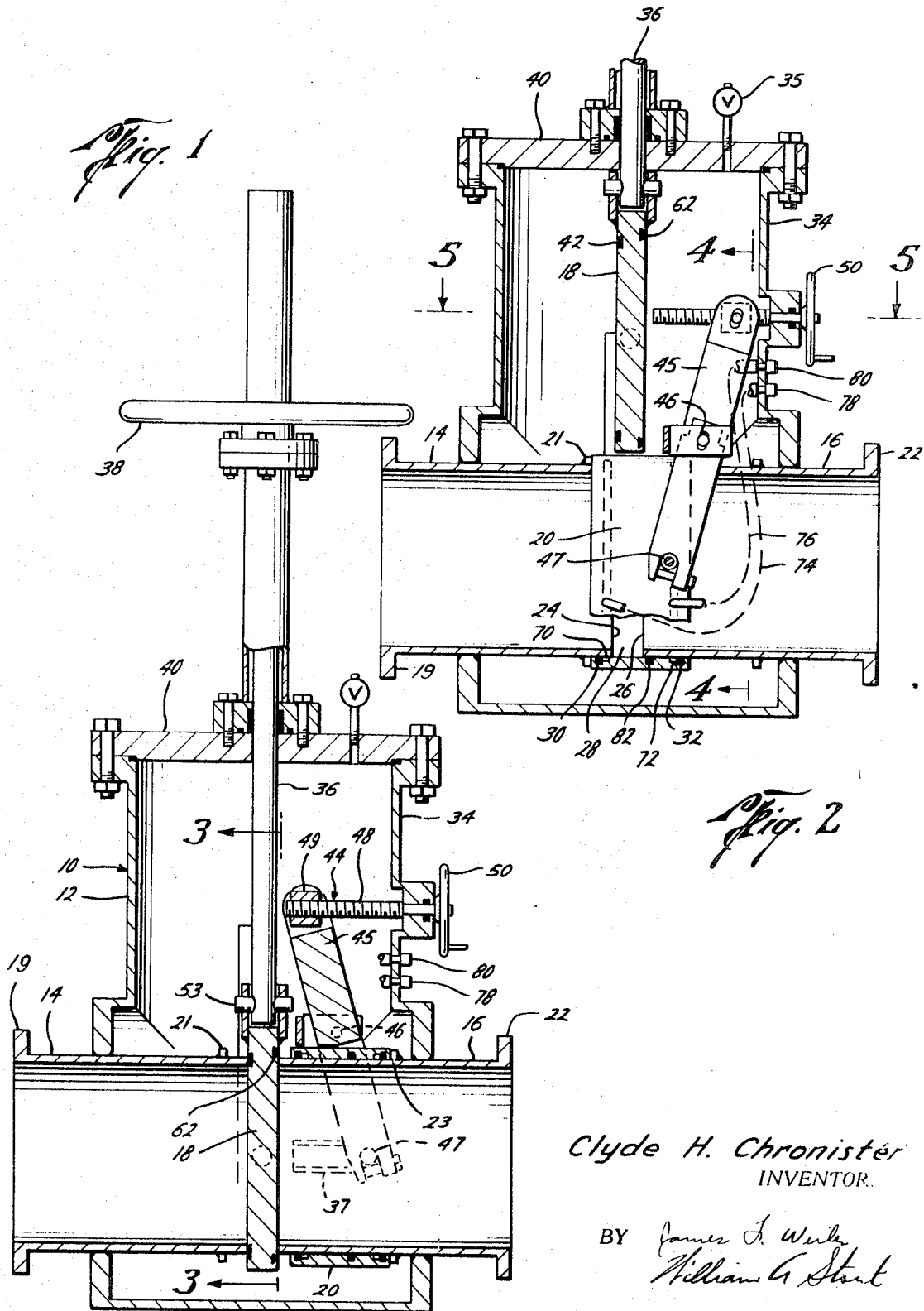
FIG. 1 is an elevational view, partly in cross section, of the apparatus of the present invention, here shown with the gate in the closed position.
FIG. 2 is a fragmentary elevational view, in cross section, illustrating the valve of FIG. 1, in an open position.

Referring now to the drawings, particularly to FIG. 1, the reference numeral 10 generally designates the through conduit gate valve of the present invention, and generally includes a housing 12, an outlet conduit 14, an inlet conduit 16, although the flow may be reversed if desired, and a gate 18 and a sliding sleeve 20.

While the housing 12, outlet 14 and inlet 16 may be of any desired shape, it is preferable that they be, for purposes of economy and providing necessary strength without requiring ribbing, conventionally sized pieces of cylindrical pipe suitably connected with conventional flange ends 20 and 22 for connection in a pipeline. It is to be noted that the outlet conduit 14 and the inlet conduit 16 are axially aligned but that their respective ends 24 and 26 are longitudinally spaced from each other to provide an opening 28 between the ends 24 and 26.

The sleeve 20 is positioned within the housing 12 and is slidably telescoping with the outlet conduit 14 and inlet conduit 16, preferably on the outside, whereby when the sleeve 20 is positioned covering the opening 28, as shown in FIG. 2, a through conduit open valve is provided, that is, a valve which provides an inner diameter as great as that of the conduits 14 and 16. Suitable seal means are provided between the sleeve 20 and the conduits 14 and 16, here shown as O-rings 30 and 32 carried by the sleeve 20. It is noted that the ends 24 and 26 of conduits 14 and 16 are beveled in order to avoid damage to seal rings 30 and 32.

The gate 18 is in the open position (FIG. 2) and is positioned in the bonnet 34 of the housing 12 and is positioned for transverse movement to the axis of the conduits 14 and 16 so as to move into and out of the opening 28. The gate 18 may be movable in the transverse direction by any suitable means such as a valve stem 36 which is conventionally actuated by hand wheel 38 (FIG. 1) acting through conventional gearing or threads (not shown) for moving the gate into proper position into the opening 28 as is conventional. The bonnet 34 includes suitable access means such as a flange 40 for access to the gate 18 as will be more fully described hereinafter.

Seal means are provided between the gate 18 and the outlet conduit 14, such as seal 42 on the gate 18 for engagement with the end 24 of the outlet conduit 14 when the gate is positioned in the opening 28.

Generally, the above described structure is shown in my copending U.S. Pat. No. 3,557,822 which also shows actuation of the sleeve by an arm connected to the gate. While this structure is satisfactory in some sized valves, the actuation mechanism requires the sleeve 20 to be extended a considerable distance thereby requiring the ends 20 and 22 to be spaced a greater distance apart than the prescribed industry standards for valves of certain sizes. The present invention is directed to providing a separate actuating means for the sleeve 20 which requires less lateral movement of the sleeve 20 thereby allowing the faces of the ends or flanges 20 and 22 to be spaced apart the prescribed distance for standard sized valves in accordance with the ANSI standards and other industry standards. Thus, suitable actuating means generally indicated by the reference numeral 44 may be provided for laterally moving the sleeve 20 into and away from the opening 28. Such means 44 may include an actuating arm 45 pivoted at pivot 46 with a first yoke end pivotally connected by pivot 47 to the sleeve 20. The second end of the arm 45 is connected to an actuation means such as a thread 48 and nut 49 which is externally controlled by a wheel 50. Stops 21 and 23 are positioned at either end of the sleeve 20 to limit the extent of travel. Support structure, generally indicated by the reference numerals 41 and 43, is interiorly of the housing 12 and provides additional strengthening to the housing 12.

Thus, as best seen in FIG. 2, the wheel 50 may be actuated to in turn actuate the arm 45 to move the sleeve 20 into and over the opening 28 closing the opening and providing a through conduit valve. And as best seen in FIG. 1, the wheel 50 may be actuated to rotate the arm 45 about the pivot 46 and retract the sleeve 20 whereby the gate 18 may be moved into the opening 28 to a position where the O-ring 42 abuts the inner end 24 of the outlet 14 to close the valve 10.

Figure 3:
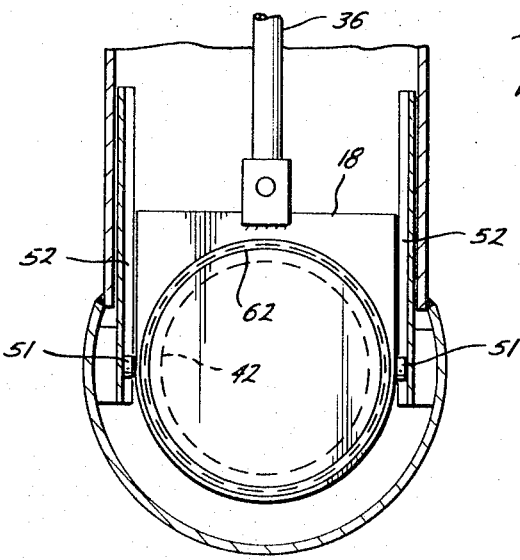
FIG. 3 is a cross-sectional view taken along the line 3—3 of FIG. 1.
Figure 4:
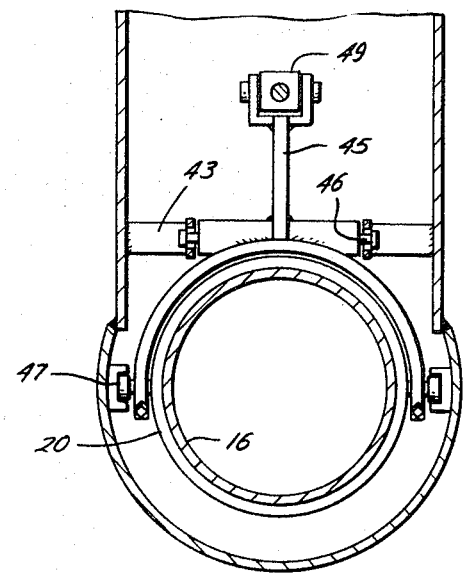
FIG. 4 is a cross-sectional view taken along the line 4—4 of FIG. 2.
Figure 5:
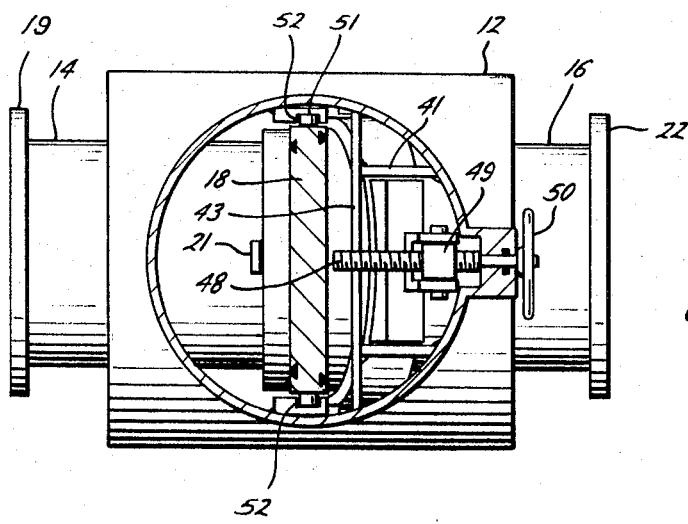
FIG. 5 is a cross-sectional view taken along the line 5—5 of FIG. 2.

Preferably, and as best seen in FIGS. 3 and 4, gate 18 includes a roller 51 on each side moving in a transverse track 52 thereby generally guiding the gate 18 in a transverse direction. Preferably, the track 52 is slightly wider than the rollers 51 to allow movement of the gate 18 when it is in the opening 28 so that it may be moved against the end 24 of the outlet conduit 14 to increase the sealing action of the seal 42. Similarly, it is preferable that the stem 36 be connected to the gate 18 by a pivot pin 53 which allows some axial movement of the gate 18 when in the passageway 28. In addition, the track 52 is positioned internally of the housing 12 and acts as a reinforcement to the housing 12.

If desired, the pressure on the seal 42 may be increased to increase the sealing pressure of the gate 18 against the end 24 of the outlet conduit 14. Referring now to FIG. 1, it is noted that the sleeve 20 is moved out of the opening 28 in order to allow the gate 18 to be inserted therein until the seal 42 is positioned against end 24. By again actuating the wheel 50, the sleeve 20 may be moved up against the back of gate 18 (not shown) under any desired force thereby pressing the gate 18 and the seal 42 against the end 24 of the outlet conduit 14 to increase the sealing pressure. If desired, the valve 10 can be made a double blocking or sealing type valve by providing a seal on the front of the valve 18, here shown as seal 62 which is contacted by the sleeve 20 as it is moved up and against the front of the gate 18.

If desired, the pivots 47 may be disposed in a longitudinal track 37 although the telescoping action of the sleeve 20 on the conduits may be sufficient in smaller sizes and service pressures.

It is to be noted from FIG. 2 that when the through gate conduit valve 10 is in the open position with the sleeve 20 covering the opening 28 that the gate 18 will be positioned in the bonnet 34. The outlet conduit 14 and the inlet conduit 16 are sealed by O-rings 30 and 32. Then the pressure trapped in the bonnet 34 which is in the area outside the conduit but inside the valve housing 12 can be relieved through the vent 35 located on the valve bonnet 34. In this position the access flange 40 may be opened allowing inspection, removal and working on the internal components of the valve 10 and also replacement of the seals 42 and 62 on the gate 18 as desired especially since the gate 18 in the present embodiment is not connected to the sleeve 20.

Since the seals 30 and 32 in the sleeve 20 are not readily replaceable, additional seal means can be provided to increase the life of the valve 10. Thus, a groove 70 is provided in the sleeve 20 adjacent the O-ring 30 on the side remote from the first end of the sleeve 20 and a second groove 72 is provided adjacent the O-ring 32 on the side remote from the second end of the sleeve 20. High pressure lubricant seal hoses 74 and 76 are connected to the grooves 70 and 72, respectively, and lead to a lubricant seal fitting 78 and 80, respectively, whereby a suitable lubricant sealant may be periodically inserted into the grooves 70 and 72 for the purpose of not only lubricating the surfaces between the sleeve 20 and the conduits 14 and 16, but to act as a backup seal for the O-ring seals 30 and 32. Additionally, an additional O-ring seal 82 is provided on the sleeve 20 to coact with the conduit ends 16, which seal may be of a harder material such as Hycar to provide increased sealing if a double block and bleed valve is desired.

In operation, and referring to FIG. 2, with the valve 10 in the open position, the sleeve 20 will cover the opening 28 and will not interfere with or reduce the internal working diameter of the conduits 14 and 16. When it is desired to close the valve 10, the wheel 50 is actuated to move the actuating arm 45 and move the sleeve 20 away from the opening 28. The wheel 38 may then be conventionally actuated to move the valve stem 36 and thus move the valve gate 18 transversely to the line. The valve gate 18 moves downwardly and into the opening 28 until the seal 42 is moved into alignment with the end 24 of the outlet conduit 14 as determined by the movement of the actuating stem 36 and is thus in the position as shown in FIG. 1. To further increase the sealing, the wheel 50 may be reversed to move the sleeve 20 against the front of the gate 18 and into engagement with the seal 62 into as tight an engagement as desired, and thus provide a double blocking or double sealing action of the valve 10. If at any time additional sealing is desired between the sleeve 20 and the conduits 14 and 16, an additional sealing lubricant may be injected into the lubricant fittings 78 and 80 and thus into the grooves 70 and 72 to provide an increased sealing action as well as a lubricating action between the sleeve and the conduits 14 and 16.

The present invention, therefore, is well adapted to carry out the objects and attain the ends and advantages mentioned as well as others inherent therein.

What is claimed is:
1. A valve comprising,
   a housing,
   an inlet conduit and an outlet conduit extending into the housing and being axially aligned with each other and each having one end positioned in the housing and longitudinally spaced from each other to provide an opening between said end,
   a sleeve within the said housing slidably telescoping with said ends of the inlet and outlet conduits in a sealing relationship whereby when the sleeve covers the opening flow is permitted through the conduits but is prevented from entering the housing,
   a valve gate positioned for movement transversely to the axis of said conduits and into and out of said opening,
   seal means on one of the gate and the end of the outlet conduit for closing the end of the outlet conduit when the gate is moved into the opening,
   means for moving said gate in said transverse direction into and out of said opening, and
   means separate from the gate moving means and connected to the sleeve and extending exteriorly of the housing for moving the sleeve over and away from the opening.
2. The apparatus of claim 1 wherein the means for moving said sleeve includes,
   an arm pivoted intermediate its ends, one end of the arm being pivotally connected to the sleeve and the second end of the arm being pivotally connected to actuating means extending exteriorly of said housing.
3. The apparatus of claim 1 including,
   an annular groove in said sleeve adjacent each end of the sleeve, and
   a conduit connected to each of the grooves leading to a point exteriorly of said housing for inserting a fluid into said grooves.
4. The apparatus of claim 3 including,
   an O-ring carried by the sleeve adjacent each groove and positioned between each groove and the adjacent end of said sleeve,
   an additional O-ring carried by said sleeve and between said sleeve and the inlet conduit adjacent the groove remote from the outlet conduit and positioned on the side of said groove remote from the end of the sleeve.
5. The apparatus of claim 1 including seal means on one side of said gate and said sleeve for sealing said valve in both directions when the sleeve is moved against the gate.
6. The apparatus of claim 5 including,
   an annular groove in said sleeve adjacent each end of the sleeve, and
   a conduit connected to each of the grooves leading to a point exteriorly of said housing for inserting a fluid into said grooves.
7. The apparatus of claim 6 including,
   an O-ring carried by the sleeve adjacent each groove and positioned between each groove and the adjacent end of said sleeve,
   an additional O-ring carried by said sleeve and between said sleeve and the inlet conduit adjacent the groove remote from the outlet conduit and positioned on the side of the groove remote from the end of the sleeve.
8. The apparatus of claim 7 including,
   means for moving said sleeve including an arm pivoted intermediate its ends, one end of the arm being pivotally connected to the sleeve and the second end of the arm being pivotally connected to actuating means extending exteriorly of said housing.
9. The apparatus of claim 8 wherein the outer ends of the inlet conduit and the outlet conduit exteriorly of the housing are spaced a distance apart equal to a standard valve.
10. The apparatus of claim 1 wherein the outer ends of the inlet conduit and the outlet conduit exteriorly of the housing are spaced a distance apart equal to a standard valve.

* * * * *